US008361545B2

(12) United States Patent
Park et al.

(10) Patent No.: US 8,361,545 B2
(45) Date of Patent: Jan. 29, 2013

(54) MANUFACTURING METHOD OF PHOTONIC CRYSTAL

(75) Inventors: In Sung Park, Seoul (KR); Tae Ho Lee, Seoul (KR); Jin Ho Ahn, Seoul (KR); Rana Biswas, Ames, IA (US); Kristen P. Constant, Ames, IA (US); Kai-Ming Ho, Ames, IA (US); Jae-Hwang Lee, Brookline, MA (US)

(73) Assignees: IUCF-HYU Industry-University Cooperation Foundation, Hanyang University, Seoul (KR); Iowa State University Research Foundation, Inc., Ames, IA (US)

( * ) Notice: Subject to any disclaimer, the term of this patent is extended or adjusted under 35 U.S.C. 154(b) by 1061 days.

(21) Appl. No.: 12/227,594

(22) PCT Filed: Jun. 1, 2006

(86) PCT No.: PCT/KR2006/002112
§ 371 (c)(1),
(2), (4) Date: Nov. 21, 2008

(87) PCT Pub. No.: WO2007/139245
PCT Pub. Date: Dec. 6, 2007

(65) Prior Publication Data
US 2009/0169735 A1    Jul. 2, 2009

(51) Int. Cl.
*B05D 5/06* (2006.01)
(52) U.S. Cl. .................. 427/162; 427/255.19; 427/248.1
(58) Field of Classification Search .................. 427/162, 427/255.19, 248.1
See application file for complete search history.

(56) References Cited

U.S. PATENT DOCUMENTS

| 6,555,406 | B1 | 4/2003 | Leung et al. |
| 6,597,851 | B2 | 7/2003 | Johnson et al. |
| 6,812,482 | B2 | 11/2004 | Fleming et al. |
| 6,999,669 | B2 | 2/2006 | Summers et al. |
| 7,670,758 | B2 * | 3/2010 | Wang et al. .................. 430/321 |

FOREIGN PATENT DOCUMENTS

| JP | 2003-344629 | 12/2003 |
| JP | 2005-066672 | 3/2005 |
| JP | 2006-015990 | 1/2006 |

(Continued)

OTHER PUBLICATIONS

Oral presentation in Korea by K.M. Ho et al., of the Nonlinear Optics Lab, Hanyang Univ., entitled "Study on Production of 3-Dimensional Optical Crystals Using Soft Lithography," presented Oct. 22, 2004.
K.M. Ho et al., "Study on Production of 3-Dimensional Optical Crystals Using Soft Lithography," Abstract in Korean and English translation thereof, Ia-03(F), *Bull. of the Korean Physical Soc.*, (on or about Oct. 22, 2004).

*Primary Examiner* — Khanh P Nguyen
*Assistant Examiner* — Margaret Squalls
(74) *Attorney, Agent, or Firm* — Harness, Dickey & Pierce, P.L.C.

(57) ABSTRACT

A manufacturing method of a photonic crystal is provided. In the method, a high-refractive-index material is conformally deposited on an exposed portion of a periodic template composed of a low-refractive-index material by an atomic layer deposition process so that a difference in refractive indices or dielectric constants between the template and adjacent air becomes greater, which makes it possible to form a three-dimensional photonic crystal having a superior photonic bandgap. Herein, the three-dimensional structure may be prepared by a layer-by-layer method.

2 Claims, 5 Drawing Sheets

FOREIGN PATENT DOCUMENTS

| | | |
|---|---|---|
| JP | 2006-041737 | 2/2006 |
| JP | 2006-048660 | 2/2006 |
| WO | WO 2005/066672 | 7/2005 |
| WO | WO 2006/015990 | 2/2006 |

* cited by examiner (a)

(b)

MANUFACTURING METHOD OF PHOTONIC CRYSTAL

This invention was made in part with Government support under Grant Number DE-AC02-07CH11358 awarded by the United States Department of Energy. The Government has certain rights in this invention.

TECHNICAL FIELD

The present disclosure relates to a manufacturing method of a photonic crystal, and more particularly to a manufacturing method of a photonic crystal with a superior photonic bandgap by conformally depositing a high-refractive-index material on a photonic crystal structure.

BACKGROUND ART

In general, photonic crystals have a periodic structure in which materials with different refractive indices or dielectric constants are repetitively arranged at regular intervals equivalent to the wavelength of light. Such photonic crystals have a photonic bandgap region in which light in a specific wavelength range are all reflected, and thus the light in the specific wavelength range does not exist inside the photonic crystals.

Particularly, the photonic bandgap of the photonic crystal is determined by a difference in refractive indices of materials or a period of each material. Furthermore, in the case where the photonic crystal has a photonic bandgap in all the directions, it is easy to realize optical devices with favorable performance, and application fields of the photonic crystal may be broadened as well.

Most studies thus far have focused on one-dimensional or two-dimensional photonic crystals because they can be easily fabricated. However, since one-dimensional or two-dimensional photonic crystals cannot have a photonic bandgap in a specific direction, they cannot act as a photonic crystal in the specific direction. Thus, in consideration of the efficiency and functionality of optical devices employing photonic crystals, there is required a three-dimensional photonic crystal having a periodicity in all the directions. The three-dimensional photonic crystal with complete bandgap for omnidirectional propagation of electromagnetic waves may be variously applied as optical devices to fiber-based telecommunications applications, single mode waveguides, channel add-drop filters, catalysis, and controllers of spontaneous emission.

Typically, manufacturing methods of such three-dimensional photonic crystals can largely be classified into self-assembly and etching methods.

In the self-assembly method, a three-dimensional structure is prepared using colloid or block copolymer as a unit cell and a refractive index of that structure or material is modified, thus obtaining the photonic crystal. To this end, a colloidal templating method has been suggested, which is fully described in U.S. Patent Publication No. 2004/0053009 A1, published on Mar. 18, 2004. The colloidal templating method includes: 1) synthesizing and crystallizing uniform silica or polystyrene particles to create a colloidal crystal; 2) filling an inorganic material such as silica and titania ($TiO_2$) into interstitial voids between the particles to thereby prepare a complex; and 3) removing the silica or polystyrene particles using a solvent or a heat-treatment to form an inverse opal structure. The process of filling the inorganic material into the interstitial voids may be performed by sol-gel, chemical vapor deposition (CVD), simultaneous ordering of a slurry, and so forth.

In the etching method, a predetermined portion is formed through a photoexposure process, and an unnecessary portion is then removed through an etching process. This method, however, is basically adapted to fabricate a two-dimensional pattern, and hence a complicated process must be performed to obtain a three-dimensional photonic crystal. For example, the etching method may be performed using layer-by-layer, wafer fusion, two-photon polymerization, electron beam lithography, glancing-angle deposition, holography or multiple-beam interference methods.

In particular, as in FIG. 1, the layer-by-layer method forms a layer-by-layer structure in which rods of the same layer are parallel with one another and alternately arranged perpendicularly to those of neighboring layers. Specifically, the layer-by-layer method includes: arranging rods at a predetermined regular interval, i.e., "a"⊙(not shown), to thereby form a first layer; forming a second layer in the same manner except that the second layer is rotated 90° with respect to the first layer; forming a third layer parallel to the first layer; and forming a fourth layer parallel to the second layer. Here, the third layer is horizontally shifted by half (a/2) the interval with respect to the first layer, and likewise, the fourth layer is horizontally shifted by half (a/2) the interval with respect to the second layer. A difference in refractive indices or dielectric constants between the rods and air surrounding them can form a photonic crystal. These four layers can constitute a unit cell of the layer-by-layer photonic structure. Therefore, it is possible to form a large photonic crystal in which the unit cells are periodically arranged, when repeating the same procedure of forming the four layers as described above.

The rods are mainly formed of polymer such as polyurethane. Hence, the layer-by-layer photonic crystal cannot exhibit a three-dimensional photonic bandgap because the polyurethane has a low refractive index of about 1.5.

To improve a three-dimensional photonic bandgap, there has been proposed an alternative method in which a high-refractive-index ceramic material, e.g., $TiO_2$ or the like, is infiltrated into a rod type layer-by-layer structure, and heat-treatment is then performed at a high temperature to remove the polymer material. In this case, however, the thickness of a thin film is reduced while the polymer is volatilized during the heat-treatment, leading to the deformation of a thin film.

DISCLOSURE

Technical Problem

Accordingly, the present disclosure is to manufacture a photonic crystal having a superior photonic bandgap in three-dimensional directions.

Technical Solution

Embodiments provide a manufacturing method of a photonic crystal having a superior photonic bandgap, including: preparing a rod type layer-by-layer structure to form a photonic crystal structure; and conformally depositing a high-refractive-index material.

Advantageous Effects

In accordance with an exemplary embodiment, a high-refractive-index material is conformally deposited on an exposed portion of a periodic template composed of a low-refractive-index material by an atomic layer deposition (ALD) process so that a difference in refractive indices or dielectric constants between the template and adjacent air becomes greater, which makes it possible to form a three-dimensional photonic crystal having a superior photonic bandgap. Therefore, a high-refractive-index material can be conformally deposited into a fine region, and thus a photonic crystal with improved photonic crystal properties can be obtained because the photonic crystal has advantages such as high heat-resistance and minimal thickness variation even during successive heat treatments.

DESCRIPTION OF DRAWINGS

Exemplary embodiments can be understood in more detail from the following description taken in conjunction with the accompanying drawings, in which.

BEST MODE

Figure 1:
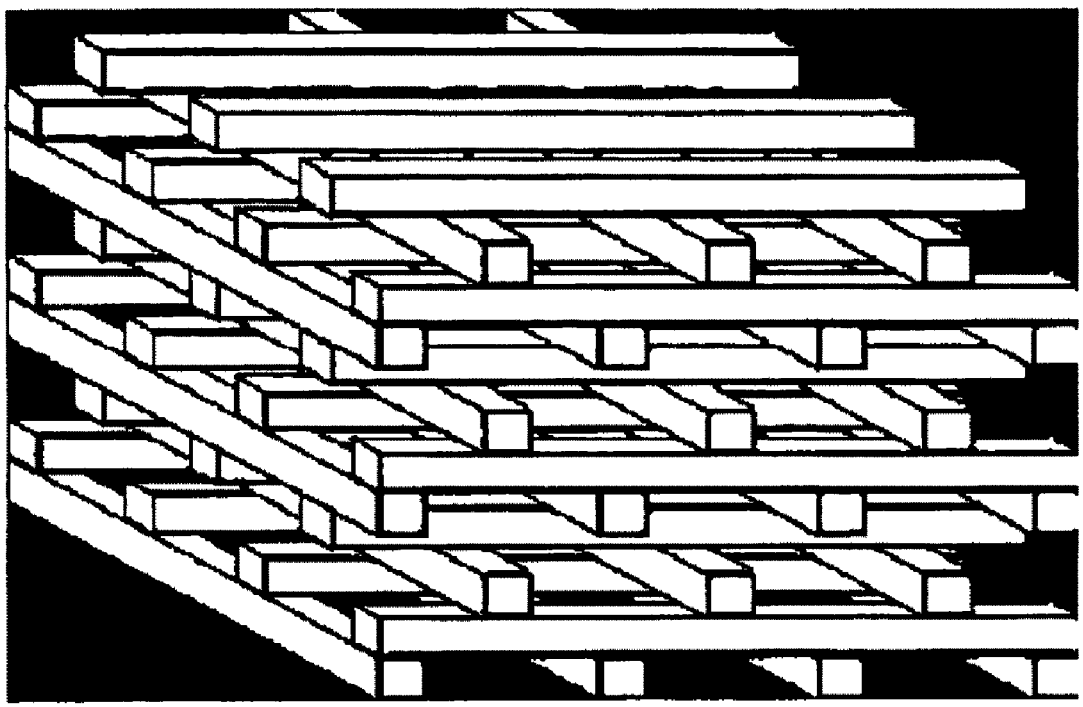
FIG. 1 is a perspective view of a rod type layer-by-layer structure manufactured by a typical layer-by-layer method.

A method of manufacturing a photonic crystal with a photonic bandgap, includes: preparing a periodic three-dimensional structure including a material having a first refractive index; and coating at least one of a surface and an inside of the periodic three-dimensional structure with a material having a second refractive index greater than the first refractive index. Herein, the coating may be performed using at least one of an atomic layer deposition (ALD), a chemical vapor deposition (CVD), and a simultaneous ordering of a slurry. In particular, the coating may be performed by the ALD.

Furthermore, the periodic three-dimensional structure may be formed using a layer-by-layer method. The layer-by-layer method includes: forming a master including a plurality of photoresist patterns on a first substrate, the photoresist patterns having a predetermined height, width and space; forming an elastomer on the master; curing the elastomer, and separating the cured elastomer from the master to form a template; filling up troughs of the template with a polymer material, and curing the polymer material by contacting the template with a second substrate; removing the template from the second substrate to form a first polymer layer; and repeating the filling up of the troughs of the template with the polymer material, the curing of the polymer material and the removing of the template from the second substrate, to thereby form at least one nth polymer layer on an (n−1)th polymer layer, wherein the nth polymer layer is rotated by 90° with respect to the (n−1)th polymer layer, and shifted in parallel by half the space with respect an (n−2)th polymer layer, where n is a positive integer greater than 1.

In addition, the material having the second refractive index may include at least one of an oxide layer, a nitride layer, a sulfide layer, a composite layer, an atomic layer, SiC and TiC, wherein the oxide layer includes $Y_2O_3$, MgO, $Al_2O_3$, $LiNbO_3$, $SrTiO_3$, $BaTiO_3$, $SiO_2$ and $TiO_2$, the nitride layer includes $Si_3N_4$, TiN and VN, the composite layer includes InAs, InP and GaAs, the sulfide layer includes ZnS, and the atomic layer includes Se, Au, Ta, W, Nb, Pt and Fe. Moreover, the material having the first refractive index may include a relatively low-refractive-index material such as polyurethane, Si, $SiO_2$, and $Al_2O_3$. The coating of the periodic three-dimensional structure with $TiO_2$ as the material having the second refractive index by using the ALD, may include: supplying a Ti precursor for the material having the second refractive index into a reaction chamber receiving the periodic three-dimensional structure at a temperature ranging from approximately 50° C. to approximately 150° C., to coat the periodic three-dimensional structure with the Ti precursor; supplying inert gas into the reaction chamber to purge the reaction chamber; supplying an oxygen precursor into the reaction chamber to form $TiO_2$ on the periodic three-dimensional structure through chemical reaction of the Ti and the oxygen precursor; and supplying inert gas into the reaction chamber to purge the reaction chamber.

MODE FOR INVENTION

Hereinafter, specific embodiments will be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

A photonic crystal structure in accordance with an exemplary embodiment can be formed by preparing a rod type layer-by-layer structure, and a photonic crystal having a superior photonic bandgap can be obtained by conformally depositing a high-refractive-index material on the rod type layer-by-layer structure. The manufacturing method of the rod type layer-by-layer structure may use a microtransfer molding technique, which is disclosed in William R. Childs and Ralph G. Nuzzo, "Decal Transfer Microlithography", Journal of American Chemical Society, vol. 124, pp. 13583-13596; William R. Childs and Ralph G. Nuzzo, "Patterning of Thin-Film Microstructures on Non-Planar Substrate Surfaces Using Decal Transfer Lithography", Advanced materials, vol. 16, pp. 1323-1327; W. Y. Leung, H. Kang, K. Constant, and D. Cann, C.-H. Kim, R. Biswas, M. M. Sigalas, K.-M. Ho, "Fabrication of photonic bandgap crystal using microtransfer molded templates", Journal of Applied Physics. vol. 93, pp. 5866-5870 (2003), and so on.

FIGS. 2(a) through 2(h) are views illustrating a method of manufacturing a rod type layer-by-layer structure in accordance with an exemplary embodiment. Hereinafter, the method of manufacturing a rod type layer-by-layer structure will be described in detail with reference to FIGS. 2(a) through 2(h).

Figure 2:
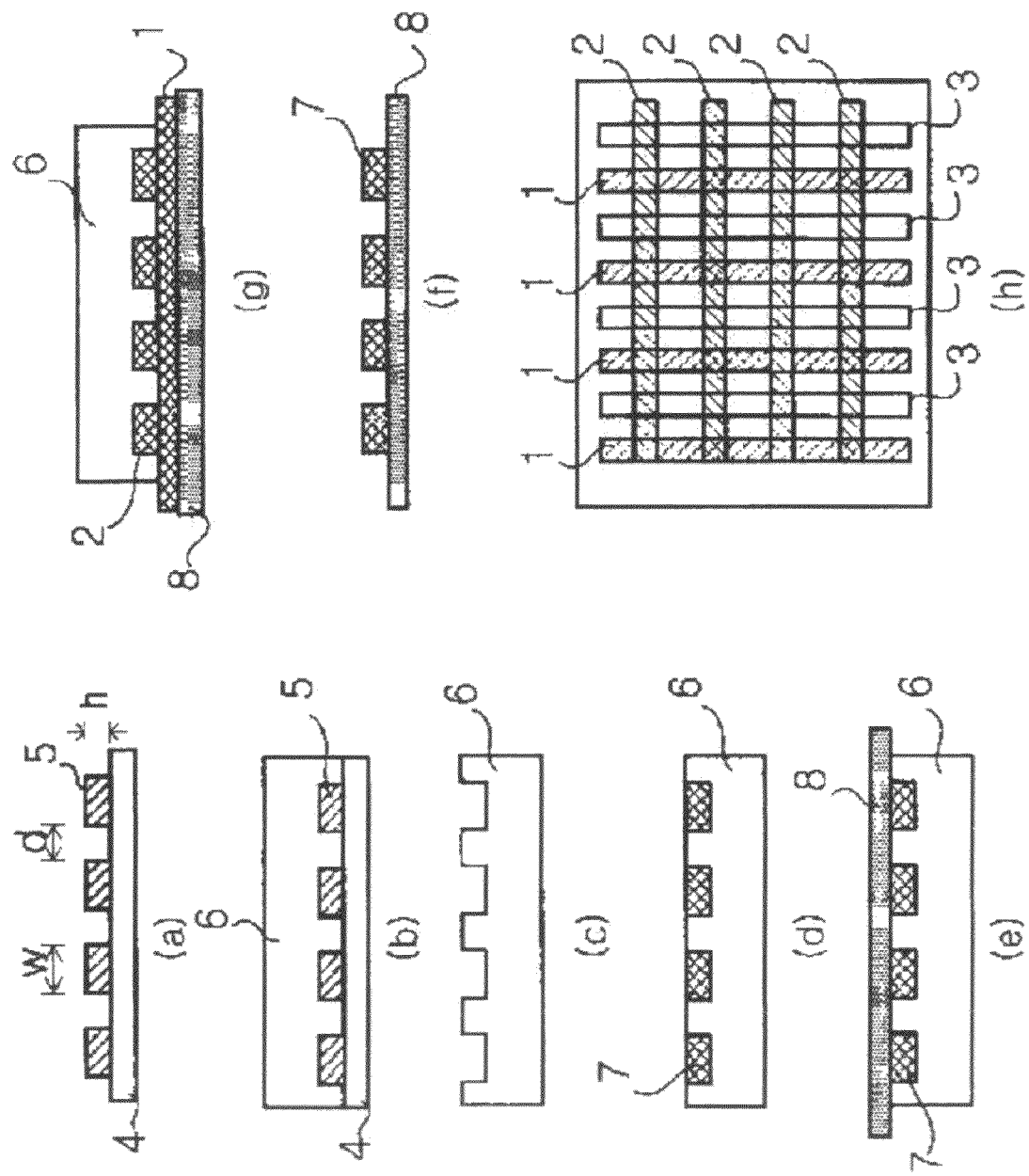
FIGS. 2(a) through 2(h) are views illustrating a method of manufacturing a rod type layer-by-layer structure in accordance with an exemplary embodiment.

In a first step, referring to FIG. 2(a), a master 5 of a photoresist (PR) pattern of which a height, a width and a space are denoted as h, w and d, respectively, is formed on a typical substrate 4 including a silicon (Si) substrate.

In a second step, referring to FIG. 2(b), an oligomer of polydimethylsiloxane (PDMS) and a curing agent are poured onto the master 5 to form an elastomer 6. In addition to the PDMS, the elastomer 6 may be formed of, for example, polyimide-based polymer, polyurethane-based polymer, fluorocarbon-based polymer, acryl-based polymer, polyaniline-based polymer, polyester-based polymer, polysilicon-based polymer, etc.

In a third step, referring to FIG. 2(c), the PDMS 6 is fully cured, and the cured PDMS is then separated from the master 5, thereby completing a PDMS template 6.

In a fourth step, referring to FIG. 2(d), troughs of the PDMS template 6 are filled with epoxy 7.

In a fifth step, referring to FIG. 2(e), the PDMS template 6 with the epoxy 7 sufficiently filled is placed in contact with another substrate 8 such as a glass substrate, and thereafter the epoxy 7 is cured.

In a sixth step, referring to FIG. 2(f), after the epoxy 7 is fully cured, the PDMS template 6 is removed from the substrate 8 to leave an epoxy pattern on the substrate 8. As a result, a polymer layer of a first layer 1 is completed.

Thereafter, the fourth through the sixth steps of forming the first layer 1 are repeated to form a second layer 2 which is rotated by 90° with respect to the first layer 1, as illustrated in FIGS. 2(g) and 2(h). Likewise, the fourth through the sixth steps of forming the first layer 1 are repeated to form a third layer 3 which is parallel to the first layer 1 but shifted horizontally by d/2 with respect to the first layer 1, as illustrated in FIG. 2(h). Subsequently, the fourth through sixth steps of forming the second layer 2 are repeated to form a fourth layer (not shown), which is parallel to the second layer 2 but shifted horizontally by d/2 with respect to the second layer 2. The above-described process is repetitively performed several times so that it is possible to manufacture a three-dimensional photonic crystal with a broad and thick region. Although polyurethane is used as a material for the template in accordance with the exemplary embodiment, other low-refractive-index materials, e.g., Si, $SiO_2$ and $Al_2O_3$, may be used besides the polyurethane.

The space (d) may be in the range of approximately 2.0 μm to approximately 3.0 μm, and may particularly be in the range of approximately 2.3 μm to approximately 2.7 μm. Furthermore, the width W may be in the range of approximately 1.0 μm to approximately 2.0 μm, and may particularly be in the range of approximately 1.2 μm to approximately 1.6 μm.

As described above, though the layer-by-layer structure prepared by such processes has a photonic crystal structure, it does not exhibit effective photonic bandgap in all the directions because the layer-by-layer structure is formed of a low-refractive-index polymer-based material of which a refractive index is approximately 1.5.

In accordance with the exemplary embodiment, a difference in refractive indices or dielectric constants between the layer-by-layer structure and air becomes pronounced by depositing high-refractive-index material on at least one of a surface or an inside of the layer-by-layer structure, which makes it possible to form a photonic crystal with improved properties.

Figure 3:
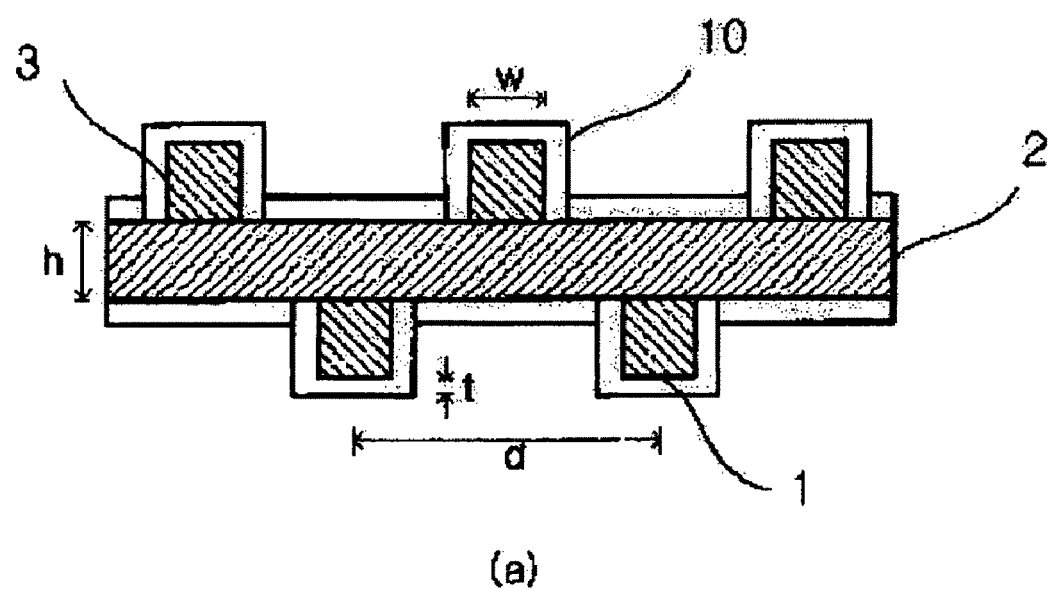
FIGS. 3(a) and 3(b) are a sectional view and a plan view, respectively, illustrating a photonic crystal structure in which a high-refractive-index material is deposited on a template having the layer-by-layer structure.
Figure 3:
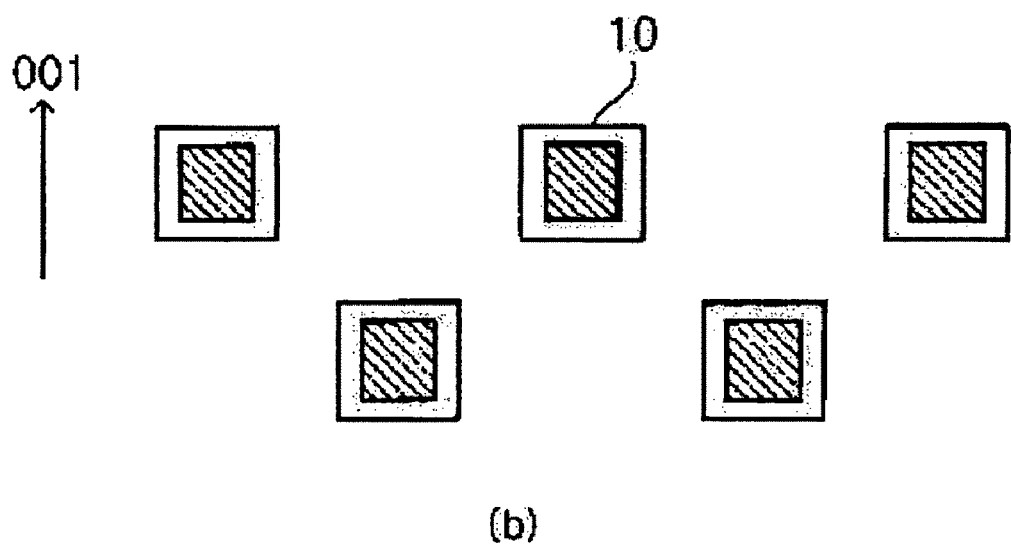

FIGS. 3(a) and 3(b) are a sectional view and a plan view, respectively, illustrating a photonic crystal structure in which a high-refractive-index material is deposited on a template having the layer-by-layer structure prepared by the method of FIGS. 2(a) through 2(h). Here, reference symbols h, w and d denote a height, a width and a space of the template 1, 2 and 3, respectively, and a reference symbol t denotes a deposition thickness of a thin film 10 of a high-refractive-index material.

In accordance with the exemplary embodiment, the high-refractive-index material may include, for example, an oxide layer such as $Y_2O_3$, MgO, $Al_2O_3$, $LiNbO_3$, $SrTiO_3$, $BaTiO_3$, $SiO_2$ and $TiO_2$, a nitride layer such as $Si_3N_4$, TiN and VN, a sulfide layer such as ZnS, a composite layer composed of InAs, InP and GaAs, an atomic layer such as Se, Au, Ta, W, Nb, Pt and Fe, SiC, TiC, and so forth. Particularly, in the exemplary embodiment, titania ($TiO_2$) has a relatively high refractive index of approximately 2.6 to approximately 2.7, which is suitable for the high-refractive-index material.

In addition, the method of coating the high-refractive-index material may employ sol-gel, CVD or simultaneous ordering of a slurry, which can be used in the second step of the colloidal templating method as described already. However, the sol-gel process is disadvantageous in that the thickness of a thin film is reduced while crystallized particles are heat-treated at a high temperature because the used solvent should be removed through a baking process. Particularly, the decrease in the thickness of the thin film is more serious vertically than horizontally with respect to the substrate. For example, in the case where $TiO_2$ is selected as the high-refractive-index material and 43% of TDBP (Titanium diisopropoxide bis(2,4-pentadionate)) is used as a precursor, the thickness of the thin film is reduced by approximately 40%. This leads to sagging of the substrate, causing inorganic line spaces to be non-uniform. Furthermore, the CVD process is also disadvantageous in that it should be performed at a high temperature, which makes it difficult to conformally deposit the inorganic material onto ultra-fine vacant spaces.

Accordingly, the photonic crystal structure in accordance with the exemplary embodiment may be formed by depositing a high-refractive-index material on the layer-by-layer structure using an atomic layer deposition (ALD) process. The ALD process is a type of CVD process, but somewhat different from a typical CVD process. That is, the ALD process is performed in such a way that precursors to participate in a reaction are sequentially injected into a reaction chamber so that the precursors do not directly react in a vapor phase but chemically react on the surface of the substrate through a chemical reaction to thereby form a thin film, which is significantly different from the typical CVD process. Compared with the typical CVD process, the ALD process is advantageous in that a deposition temperature is relatively low, and conformal deposition is possible even in a fine structure, i.e., a structure with a high aspect ratio, and an impurity content is also relatively low. The thickness of the thin film formed of high-refractive-index material by the ALD process is determined according to number of deposition cycles. Generally, since an atomic layer is deposited during one deposition cycle, it is possible to precisely control the thickness (t) of the high refractive thin film depending on deposition conditions.

In the exemplary embodiment, $TiO_2$ is selected among the high-refractive-index materials, and a $TiO_2$ thin film is deposited on the layer-by-layer template by the ALD process, which will be illustrated in detail below.

First, a Ti precursor is supplied into a reaction chamber in a temperature range of approximately 50° C. to approximately 500° C. so that the Ti precursor is adsorbed on the template in the reaction chamber. The adsorption amount is sufficient only if the template is uniformly covered with the Ti precursor. A supply duration may be 0.1 seconds or longer at the least. Particularly, the supply duration may be set as short as possible taking into account process efficiency for mass production. Here, the Ti precursor may include, for example, a halide-based precursor such as $TiCl_4$ and $TiI_4$, an alkoxide-based precursor such as $Ti(OC_2H_5)_4$ and $Ti(OCH(CH_3)_2)_4$, an alkylamide-based precursor such as $Ti(N(CH_3)_2)_4$ and $Ti(N(C_2H_5)(CH_3)_4$.

Inert gas such as Ar and $N_2$ as purge gas is supplied into the reaction chamber. Thus, the Ti precursor chemically adsorbed on the template still remains as an atomic layer, whereas the physically adsorbed Ti precursor is purged.

Thereafter, an oxygen precursor is supplied into the reaction chamber at a room temperature, and hence reacts with the Ti precursor adsorbed on the template to form a $TiO_2$ layer. Herein, the oxygen precursor may include, for example, $O_2$, $O_3$, $H_2$, $H_2O_2$, alcohol, direct plasma-oxygen, remote plasma-oxygen. The supply duration may be set to 0.1 seconds or longer at the least, as similar to the supply duration of the Ti precursor.

Figure 4:
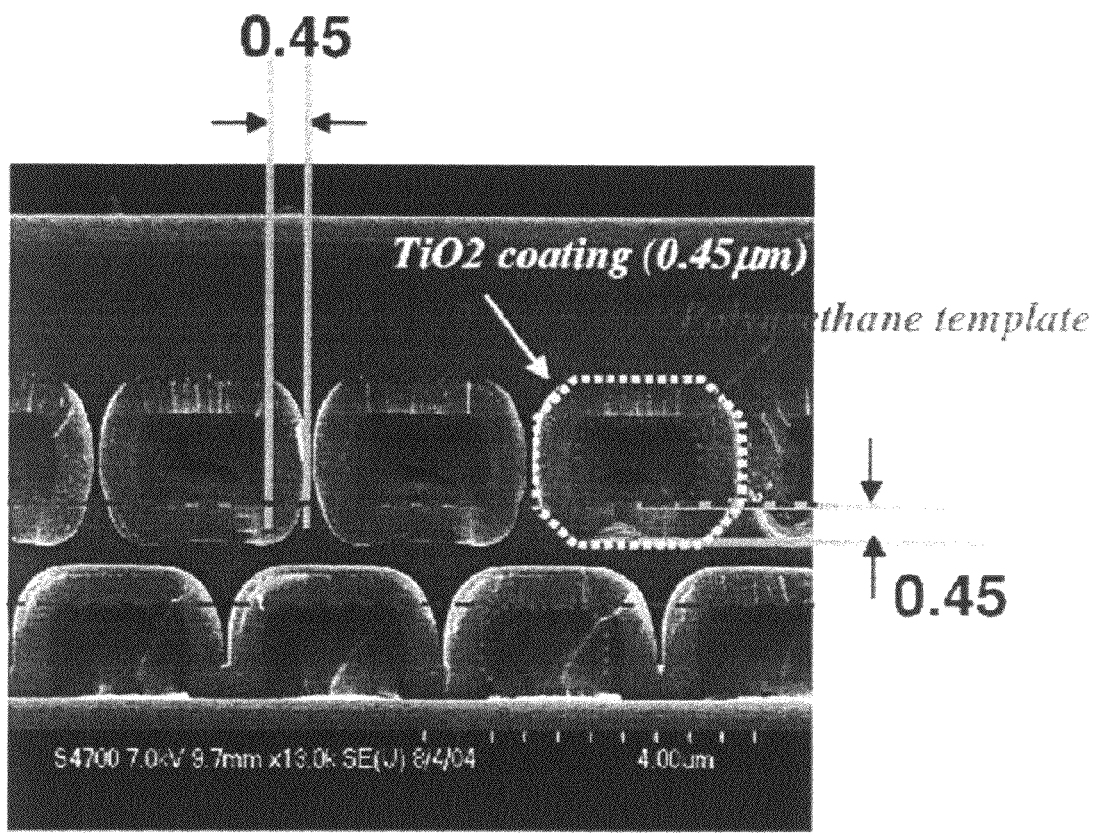
FIG. 4 is an electron microscope image illustrating a section of a photonic crystal manufactured by an exemplary embodiment.

Afterwards, inert gas such as Ar and $N_2$ is again supplied as purge gas into the reaction chamber to discharge unreacted substances to the outside, thus forming a $TiO_2$ thin film on the layer-by-layer structure template finally. Considering that the layer-by-layer structure template is formed of elastomer in the exemplary embodiment, the deposition process may be performed at a temperature ranging from approximately 50° C. to approximately 150° C. at which the elastomer is not deformed. In the exemplary embodiment, in the case where $TiCl_4$ and $H_2O$ are used as precursors and $N_2$ gas is used as purge gas, it was possible to obtain a deposition rate of approximately 1 A/cycle under conditions of supplying $TiCl_4$ for 0.5 seconds, $N_2$ purge gas for 10 seconds, $H_2O$ for 10 seconds and $N_2$ purge gas for 30 seconds respectively at 100° C. FIG. 4 is an electron microscope image illustrating a section of a photonic crystal (d=2.5 µm, w=1.4 µm, and t=0.45 µm) in accordance with an exemplary embodiment. That is, the thickness of the $TiO_2$ thin film is 0.45 µm, and a dotted line shows the outline of the second layer 2 formed between the first and second layers 1 and 3 before the conformal coating.

Figure 5:
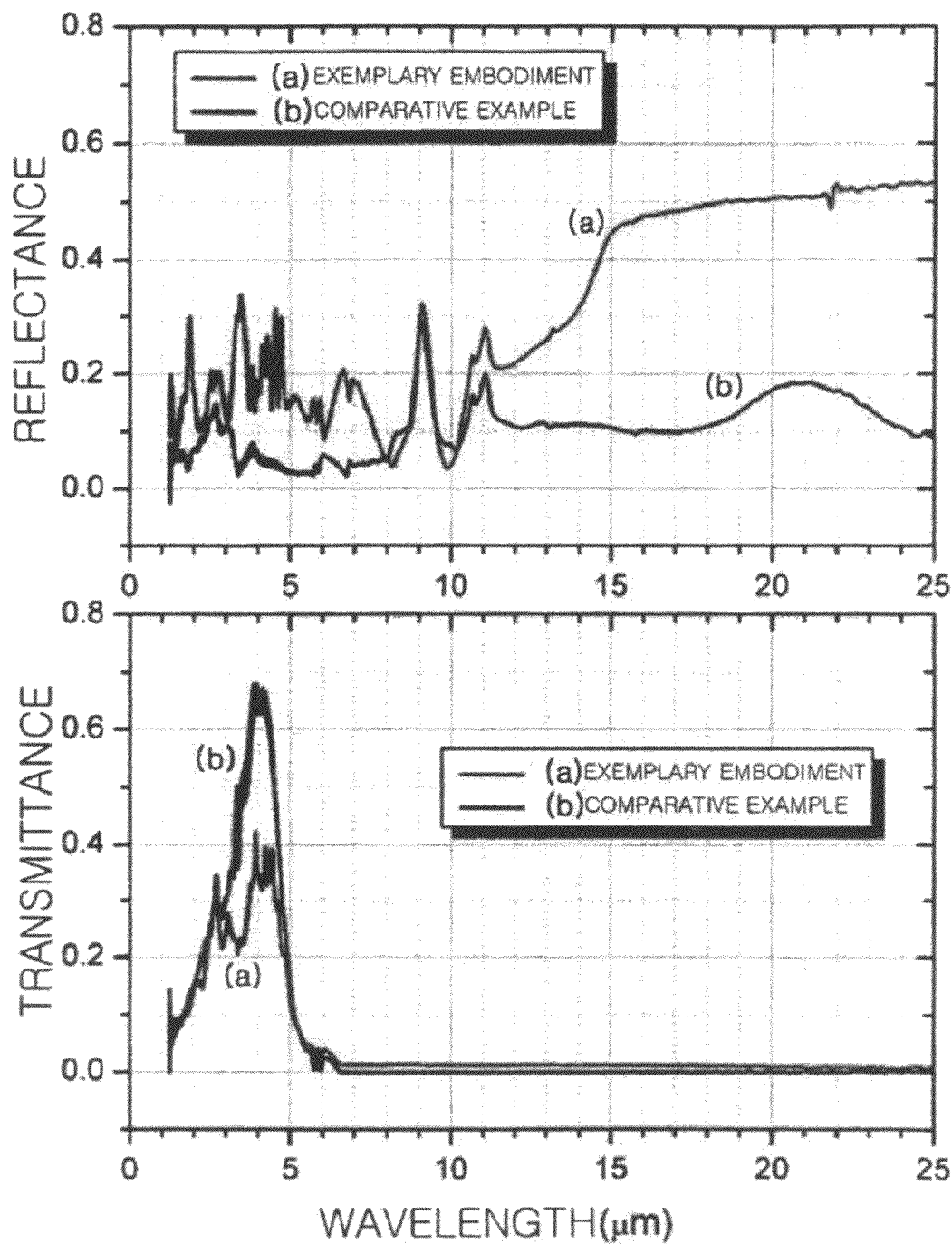
FIG. 5 is a graph illustrating reflection and transmission characteristics of photonic crystals manufactured by an exemplary embodiment and a comparative example.

FIG. 5 is a graph illustrating reflection and transmission characteristics of photonic crystals manufactured by the exemplary embodiment and a comparative example. Specifically, while the photonic crystal prepared by the comparative example denotes a photonic crystal having only a layer-by-layer structure template formed of polyurethane, the photonic crystal prepared by the exemplary embodiment denotes a photonic crystal obtained by depositing $TiO_2$ thin film on the same template as the comparative example. Both the photonic crystals were formed on a 150 µm thick glass substrate. After preparation, reflectance and transmittance of the photonic crystals are measured with a Fourier transform infrared spectrometer.

Referring to FIG. 5, for wavelengths above approximately 5 µm, light is absorbed by the glass substrate so that a transmittance is low. Especially, in a wavelength band of approximately 2 µm to approximately 4.5 µm, it can be observed that the photonic crystal of the exemplary embodiment exhibits a bandgap property that is improved over the comparative example, and thus, its absorption rate is significantly increased to reduce the transmittance. Furthermore, it can be observed that the photonic crystal of the exemplary embodiment also exhibits superior reflection characteristics to the comparative example in this wavelength band. That is, in the comparative example, a ratio between the refractive indices of the low refractive polyurethane of the template and adjacent air is excessively low. However, in the exemplary embodiment, since high refractive $TiO_2$ is deposited on the polyurethane with a low refractive index, it is possible to considerably increase a ratio between the refractive indices of the $TiO_2$ and adjacent air, thus allowing the absorption rate to be increased and the transmittance to be decreased. Furthermore, a reflective peak appears in a wavelength band of approximately 6 µm to approximately 7 µm in the exemplary embodiment, which was not observed in the comparative example. This phenomenon takes place because a diffraction ratio of anantase $TiO_2$ is reduced to 1.9 or less in this wavelength band.

As described above, in accordance with a manufacturing method of a photonic crystal of the exemplary embodiment, a high-refractive-index material is deposited on an exposed portion of a periodic template formed of a low-refractive-index material using an ALD process, which makes it possible to form a three-dimensional structure photonic crystal having a photonic bandgap.

Although the manufacturing method of a photonic crystal has been described with reference to the specific embodiments, it is not limited thereto. Therefore, it will be understood that various modifications and other embodiments can be made by those skilled in the art. Furthermore, features and/or elements of all the embodiments may be used independently or in combination with other embodiments. Accordingly, following claims should be construed that they include all the modifications and embodiments without departing from the spirit and scope of the present invention.

INDUSTRIAL APPLICABILITY

In accordance with the exemplary embodiment, it is possible to manufacture a photonic crystal having a superior photonic bandgap by conformally depositing a high-refractive-index material on a photonic crystal structure.

The invention claimed is:

1. A method of manufacturing a photonic crystal with a photonic bandgap, the method comprising:
   forming a periodic three-dimensional structure comprising a material having a first refractive index and a plurality of gaps; and conformally depositing exposed surfaces of the periodic three-dimensional structure with a material having a second refractive index greater than the first refractive index; and wherein the material having the first refractive index comprises at least one of polyurethane, Si, $SiO_2$, and $Al_2O_3$; wherein the material having second refractive index is $TiO_2$ and wherein disposition of the $TiO_2$ upon the periodic three-dimensional structure is performed using an atomic layer deposition (ADL); and wherein disposition comprises supplying a Ti precursor for the material having the second refractive index into a reaction chamber receiving the periodic three-dimensional structure at a temperature ranging from approximately 50° C. to approximately 150° C., to coat the periodic three-dimensional structure with the Ti precursor; supplying inert gas into the reaction chamber to purge the reaction chamber; supplying an oxygen precursor into the reaction chamber to form $TiO_2$ on the periodic three dimensional structure through chemical reaction of the Ti precursor and the oxygen precursor; and supplying inert gas into the reaction chamber to purge the reaction chamber.

2. The method of claim 1, wherein the periodic three-dimensional structure is prepared by a method comprising:
   forming a master comprising a plurality of photoresist patterns on a first substrate, the photoresist patterns having a predetermined height, width and space;
   forming an elastomer on the master;
   curing the elastomer, and separating the cured elastomer from the master to form a template;
   filling troughs of the template with a polymer material, and curing the polymer material by contacting the template with a second substrate;
   removing the template from the second substrate to form a first polymer layer; and
   repeating the filling of the troughs of the template with the polymer material, the curing of the polymer material and the removing of the template from the second substrate, to thereby form at least one nth polymer layer on an (n−1)th polymer layer, wherein the nth polymer layer is rotated by 90° with respect to the (n−1)th polymer layer, and shifted in parallel by half the space with respect an (n−2)th polymer layer, where n is a positive integer greater than 1.

* * * * *